United States Patent
Wang et al.

(10) Patent No.: US 9,392,173 B2
(45) Date of Patent: Jul. 12, 2016

(54) IMAGE DEBLURRING BASED ON LIGHT STREAKS

(71) Applicant: Adobe Systems Incorporated, San Jose, CA (US)

(72) Inventors: Jue Wang, Kenmore, WA (US); Sunghyun Cho, Seattle, WA (US); Zhe Hu, Merced, CA (US)

(73) Assignee: Adobe Systems Incorporated, San Jose, CA (US)

( * ) Notice: Subject to any disclaimer, the term of this patent is extended or adjusted under 35 U.S.C. 154(b) by 68 days.

(21) Appl. No.: 14/105,554

(22) Filed: Dec. 13, 2013

(65) Prior Publication Data

US 2015/0172547 A1    Jun. 18, 2015

(51) Int. Cl.
*H04N 5/232* (2006.01)
*G06T 5/00* (2006.01)

(52) U.S. Cl.
CPC ............ *H04N 5/23267* (2013.01); *G06T 5/003* (2013.01)

(58) Field of Classification Search
None
See application file for complete search history.

(56) References Cited

U.S. PATENT DOCUMENTS

2014/0078321 A1 *   3/2014   Hong ......................... 348/208.1

OTHER PUBLICATIONS

Hua, Binh-Son, and Kok-Lim Low. "Interactive motion deblurring using light streaks." Image Processing (ICIP), 2011 18th IEEE International Conference on. IEEE, 2011.*
Queiroz, Francisco, et al. "Image deblurring using maps of highlights." Acoustics, Speech and Signal Processing (ICASSP), 2013 IEEE International Conference on. IEEE, 2013.*
Goldstein, Amit, and Raanan Fattal. "Blur-kernel estimation from spectral irregularities." Computer Vision—ECCV 2012. Springer Berlin Heidelberg, 2012. 622-635.*

* cited by examiner

*Primary Examiner* — Bhavesh Mehta
*Assistant Examiner* — Menatoallah Youssef
(74) *Attorney, Agent, or Firm* — Shook, Hardy & Bacon L.L.P.

(57) ABSTRACT

A blurred image having a spatially invariant motion blur resulting from camera motion during image capture is deblurred based on one or more light streaks identified and extracted from the blurred image. A blur kernel for the blurred image is estimated by performing an optimization procedure having a blur kernel constraint based at least in part on the light streak. One or more light streaks can in some embodiments be posed as the blur kernel constraint. A modeled light streak may be defined as a convolution between the blur kernel and a simulated light source, with the optimization procedure being to minimize a distance between the modeled light streak and the corresponding identified light streak from the blurred image.

18 Claims, 6 Drawing Sheets

IMAGE DEBLURRING BASED ON LIGHT STREAKS

TECHNICAL FIELD

This disclosure generally relates to image processing. More particularly, the disclosure relates to image deblurring, including methods and systems for deblurring images captured in low-light conditions.

BACKGROUND

In photography, motion blur is a common problem that produces blurry images. Such motion blur is caused by camera sensor movement relative to the captured scene during exposure. The occurrence of motion blur artifacts is particularly prevalent for images captured in low-light conditions, because there is a greater likelihood of camera movement or camera shake during the longer exposure times needed for proper exposure.

Various deblurring techniques have been proposed to remove or ameliorate motion blur effects from images by processing and modifying representative image data according to particular schemes. Existing deblurring techniques, however, often provide unsatisfactory results, particularly for real-world blurry images captured under low-light conditions.

BRIEF DESCRIPTION OF THE DRAWINGS

Some embodiments are illustrated by way of example and not limitation in the figures of the accompanying drawings.

FIG. 3 also shows an example light streak patch extracted from the blurred image, and a modeled light streak approximating the extracted light streak patch and comprising a convolution between a simulated light source and the blur kernel, in accordance with the example embodiment.

DETAILED DESCRIPTION

Figure 1:
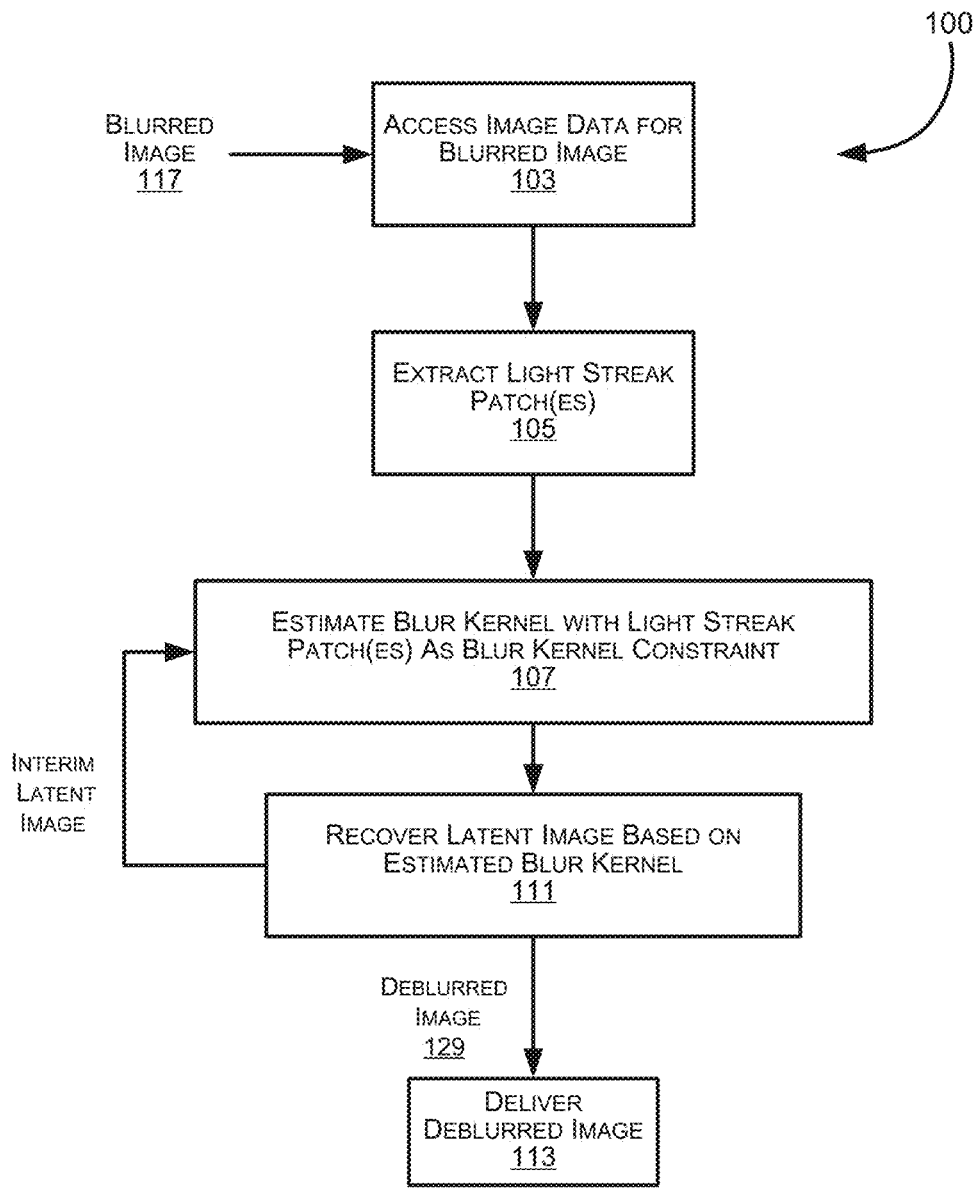
FIG. 1 is a schematic flowchart illustrating a method for image deblurring using one or more light streaks in a blurred image, in accordance with an example embodiment.

In the following description, for purposes of explanation, numerous specific details are set forth to provide a thorough understanding of example embodiments. It will be evident to one skilled in the art, however, that the present subject matter may be practiced without these specific details.

Overview

One aspect of the disclosure provides an image deblurring method that uses one or more light streaks in a blurred image to estimate a blur kernel in a constrained optimization procedure that is a blur kernel constraint based at least in part on the one or more light streaks. In one embodiment, a light streak patch extracted from the blurred image and containing a corresponding light streak may be posed as the blur kernel constraint.

In some embodiments, multiple light streak patches may be identified and extracted for use in blur kernel estimation. In one embodiment, the method includes generating an idealized light streak based on a plurality of light streak extracted from the blurred image. The idealized light streak may be generated in an iterative optimization operation to compute best fit parameters for the plurality of extracted light streaks.

The method may further include recovering the blurred image by estimating a deblurred image in a computation that uses the estimated blur kernel as an input. Note that the computation for estimating a deblurred image is an operation that is separate from the constrained optimization procedure for estimating the blur kernel. In this context, the blur kernel estimation and the deblurred image estimation may be performed in repeating, alternating iterations, with an output of one iteration of the blur kernel estimation being used as an input for one iteration of the blurred image estimation, and this output of the one iteration of the blurred image estimation being used as an input for a successive iteration of the blurred image estimation, and so forth.

The method may include defining a modeled light streak for each light streak patch extracted from the blurred image, the blur kernel estimation comprising optimizing a distance between the respective light streak patch and the corresponding modeled light streak. In one example embodiment, the method comprises defining a blur kernel energy function reflecting the distance between the modeled light streak and the corresponding structured light streak patch. Estimating the blur kernel may in such cases comprise optimizing the blur kernel energy function to find blur kernel values which minimize the distance between the modeled light streak and a corresponding structured light streak patch. Such optimization may in some embodiments be performed with respect to multiple light streak patches and multiple corresponding modeled light streaks.

Each modeled light streak may comprise a convolution between the blur kernel and a simulated or artificial light source. In one embodiment, the simulated light source has generic characteristics and may be used commonly for simulating multiple light streaks. In a particular embodiment, the simulated light source comprises a point light source with Gaussian distribution. In other embodiments, different simulated light sources may be defined for different extracted light streak patches, for example by variation of light source diameter and light source intensity values based on analysis of the light streak in the corresponding light streak patch.

In some embodiments, identification of light streaks in the blurred image for use in blur kernel estimation may comprise receiving user input selecting one or more light streak patches. Instead, or in addition, the method may include automatically identifying one or more light streaks for use in blur kernel estimation. In such cases, the method may include calculating a light streak quality metric value for each one of a plurality of candidate light streak patches. The method may in such cases include identifying from the plurality of candidate light streak patches a most suitable or prime light streak patch based on the calculated light streak quality metrics.

The light streak quality metric may be based on the power spectrum of the blurred image, and on the power spectrums of the respective candidate light streak patches. The light streak quality metric may in such cases be defined to provide a quantification of similarity between the power spectrum of the respective light streak patch and the power spectrum of the blurred image More particular features of example embodiments of the disclosed method and system will now be described.

Example Deblurring Method

This disclosure describes some example embodiments of systems and methods that are configured to process images and/or create modified or simulated images via an image or photo editing application, such as the Adobe® Photoshop® family of applications. The technology may be implemented by one or more applications resident on a computing device (e.g., mobile computing device) and/or in a networked environment (e.g., a cloud-based network environment) where processing may, or may not, be distributed.

As mentioned, image blur resulting from motion of a camera relative to a scene which is being captured is a common problem, and occurs more often in low-light situations where longer exposure times are used. This can further degrade image quality in terms of noise and image structure. Existing deblurring techniques are typically less successful the darker and more blurry an image is.

A blurred image that displays motion blur due to camera shake can be modeled as the convolution of a latent image and a spatially invariant blur kernel, with the blur kernel describing the trace of the relevant camera sensor during image capture. The term "latent image" here means an image which would have been captured, had there been no camera motion, and can also be referred to as the sharp image. The object of the deblurring process is to provide a deblurred image which is an estimation of the latent image. This image model can be expressed as, $$B = K * I + n \qquad (1)$$

where B is the blurred image; I is the latent image; K is the spatially-invariant blur kernel; n represents noise, and * is the convolution operator.

Removing motion blur from the blurred image thus becomes a deconvolution operation. In a non-blind deconvolution, the blur kernel is given and the problem is to convert the latent image from the blurred image using the kernel. In blind deconvolution, the blur kernel is unknown, and recovery of the latent image becomes more challenging. The task for blind deconvolution from a single image is to infer both the blur kernel (K) and the latent image (I) from a single input in the form of the blurred image (B), and is formulated here as an optimization problem, $$(\hat{I}, \hat{K}) = \underset{(I,K)}{\operatorname{argmin}} \sum_{\partial^*} |\partial^* B - \partial^* I * K|^2 + \phi_I(I) + \phi_K(K). \qquad (2)$$

where $\partial^* \in \{\partial_x, \partial_y\}$ is the derivative operator; $\emptyset_I$ denotes an optimization constraint for the latent image; and $\emptyset_K$ denotes an optimization constraint for the blur kernel, also referred to herein as the blur kernel constraint.

This problem is ill-posed, because the unknowns exceed the observed data. As will be described with reference to FIG. 1, the optimization framework is thus decomposed into separate operations for blur kernel estimation and latent image reconstruction, and an iterative, alternating optimization framework is employed. In this framework, the blur kernel is obtained from the estimated latent image and the given blurred image. The kernel is then used to estimate a latent image by applying non-blind deconvolution to the given blurred image. The new estimated latent image is used for kernel estimation in the next iteration, and so forth.

Some existing techniques that use such an iterative optimization structure are based on explicit edge selection, thereby attempting to avoid trivial delta kernel solutions. These methods are appropriate only for images where salient edges can be identified readily and clearly. A further difficulty with application of such techniques to low-light images, however, is that low-light images often have few identifiable object edges (e.g., due to lack of lighting on the subject scene), while such images as there are, are less salient than would be useful for edge-selection motion deblurring. This is because pixel intensities at or around the edges have luminosity or intensity values that are distributed on a low-value section of the relevant intensity/luminosity spectrum (e.g., below 80 on a 256 value spectrum). For such images, edge-selection motion deblurring tends to favor delta kernel solution, thus failing to recover the latent image.

Although most pixel intensities in low-light images are low, there are typically some bright light streaks or spots in the blurred image, caused by camera motion or camera shake relative to respective light sources in the scene captured by the image. These light sources can include original light sources (e.g., light bulbs, flashlights, or the like), or reflections of original light sources. These light streaks thus effectively represent blurred light sources. Because the blurring of a light source, to produce a light streak in the blurred image, is caused by the same relative camera motion that causes blurring of the image generally, the light streaks are representative of a blur trajectory (e.g., a 2-D projection of camera sensor movement during image capture).

The example embodiment of the methods and systems described below uses light streaks in a blurred image captured under low-light conditions as an optimization parameter for blur kernel estimation. The latent image may then be recovered based on the estimated blur kernel. In some embodiments, light streaks in the blurred image may be identified automatically.

FIG. 1 is a high-level schematic flowchart of an example embodiment of a method 100 for deblurring a blurred image by using light streaks from the image. At operation 103, a photo editing application (e.g., Adobe® Photoshop®, LightRoom® or the like) accesses digital image data for a blurred image 117 (see FIG. 3) captured under low-light conditions. A scene captured in the blurred image 117 includes a number of light sources that, because of camera shake during image capture, produced respectively corresponding light streaks 120 (FIG. 3) in the blurred image 117.

At operation 105, light streak patches 119 (see FIG. 3) are extracted from the blurred image 117. In this example embodiment, a single light streak patch 119 is extracted for use in image deblurring. In other embodiments, multiple light streak patches 119 can be extracted. In this example embodiment, as will be described in further depth below with reference to FIG. 2, a particular light streak patch 119 which is highest in quality for use in blur kernel estimation (also referred to herein as the best light streak patch or the prime light streak patch) is identified and extracted from the blurred image 117 in an automated process. In other embodiments, however, the method may instead, or in combination, comprise user-selection of a representative light streak patch 119, or of multiple light streak patches 119. This may comprise presenting the user with a light streak selection user interface on a user device, to prompt user-selection of a light streak patch 119 by, e.g., painting a selected region of the blurred image 117, or by drawing a selection rectangle around the corresponding light streak 120.

At operation 107, a blur kernel 123 (see FIG. 3) is estimated in an iterative optimization structure which uses the extracted light streak patch 119 as an optimization parameter. As will be described at greater length with reference to FIG. 4, the extracted light streak patch 119 (or, in some embodiments, multiple light streak patches 119) is used as an optimization constraint for the blur kernel 123. Notice that the blur kernel 123 is not simply equated with the light streak 120 from the light streak patch 119, but that the light streak patch 119 is used as an additional queue for blur kernel estimation. The optimization framework for estimation of the blur kernel 123, at operation 107, in this embodiment includes explicitly modeling a light streak 120 based on a point light source 303 (see, e.g., FIG. 3), and formulating a kernel estimation energy function that minimizes differences between the modeled light streak and the light streak patch 119. In some embodiments, multiple light streaks 120 may be modeled based on multiple respective light sources 303, and the iterative blur kernel 123 estimation may be performed based on multiple extracted light streak patches 119.

At operation 111, the latent image is recovered by deconvolution (e.g., by a regularized Richardson-Lucy deconvolution) based on the estimated blur kernel 123. The recovered latent image may be used to refine the customization of the blur kernel 123, at operation 107, so that several iterations of the blur kernel estimation procedure (at operation 107) and the latent image recovery procedure (at operation 111), may be performed before a final deblurred image 129 is delivered, at operation 113.

Automated Light Streak Detection

Figure 2:
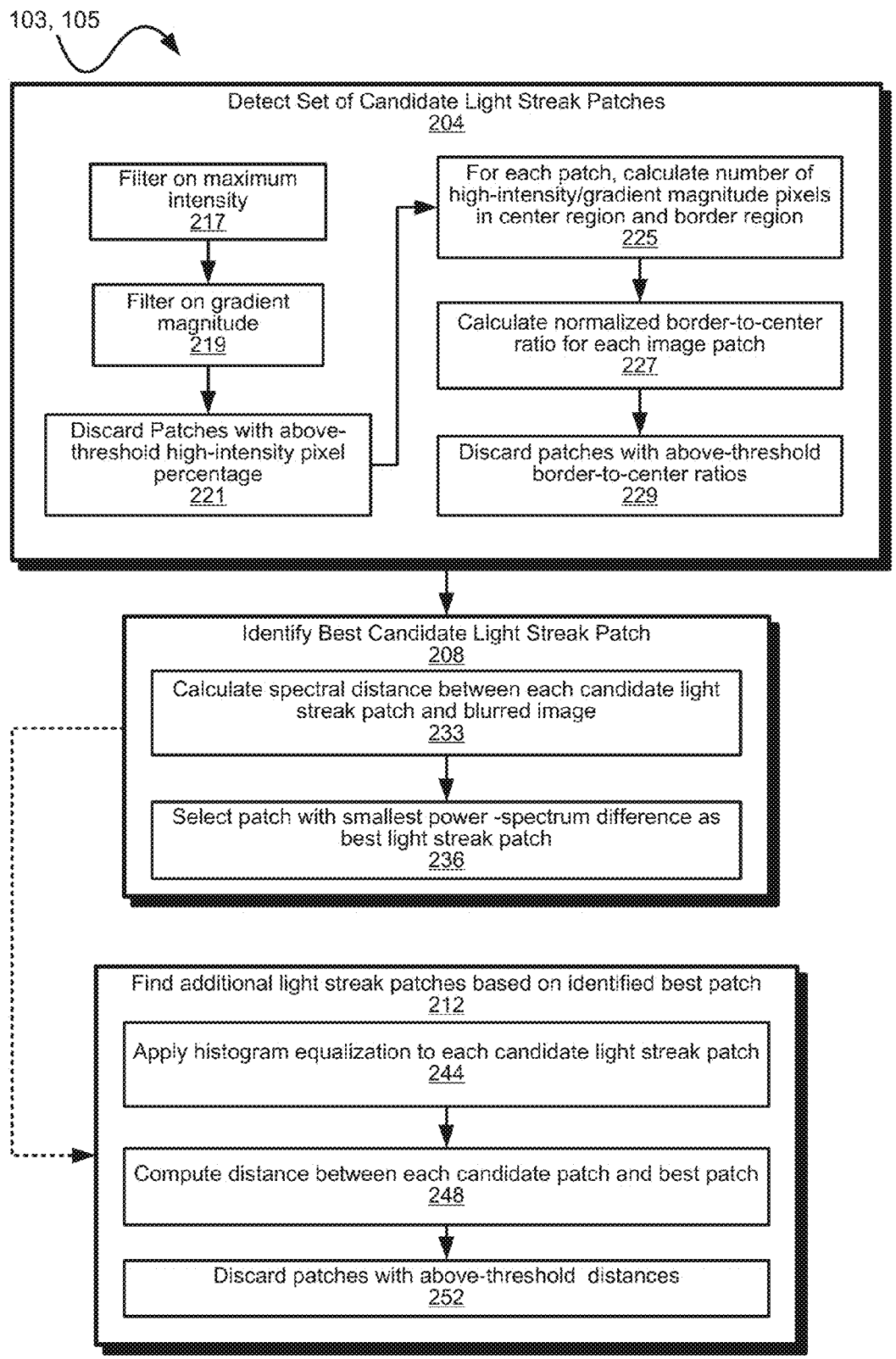
FIG. 2 is a schematic flowchart illustrating methods for automatically identifying one or more candidate light streak patches and for extracting light streak information from the blurred image for use in blur kernel estimation, in accordance with an example embodiment.

FIG. 2 is a schematic flowchart of an example embodiment of a method used for the operation (i.e., operation 105) of extracting light streak patches 119 from the blurred image 117. In this example embodiment, automated light streak detection is performed in a three-stage process comprising, at operation 204, detecting a set of candidate image patches that potentially contain light streaks 120; and, at operation 208, identifying a prime candidate patch based on similarity between the respective image patches and the underlying blur kernel 123 (in this example using a power-spectrum-based metric).

The example method of FIG. 2 also shows, at operation 212, a further step that may be performed in embodiments where multiple light streak patches 119 are used in blur kernel estimation. Operation 212 in this example comprises using the identified prime light streak patch 119a to find additional light streak patches 119. A benefit of embodiments that identify and use multiple light streak patches 119 is that that a single light streak may be saturated (or partially saturated), and may thus contain only limited information indicative of the blur kernel 123. By using information for multiple light streaks 120 (captured in respective light streak patches 119), more blur kernel information can be extracted cumulatively from the multiple light streaks 120. The use of multiple light streak patches 119 from different parts of the blurred image 117 promotes better stability against image noise and local distortions.

In this example, initial detection of candidate light streak patches 119, at operation 204, is based on four separate identification properties based on the physical nature of light streak patches suitable for use in blur kernel estimation. These properties are:

Property 1: Pixels in a light streak have relatively high intensities and those on the background of a light streak patch have relatively low intensities, in a local neighborhood.

Property 2: The high-intensity pixels in a light streak patch have a sparse distribution.

Property 3: A light streak is located near the center of a patch.

Property 4: There are no other image structures in a light streak patch.

To permit automated light streak patch detection, quantified identification criteria are defined for each of the four properties listed above. Because the purpose of the operation of detecting a set of candidate patches is primarily to remove irrelevant image patches from being considered in later operations (for reducing computational cost), a set of heuristic filters can be applied to detect the set of candidate patches. In accordance with Property 1, two thresholds are applied on image intensity, at operation 217, and gradient magnitude, at operation 219, to filter out dark and flat patches. In this example, the thresholds are set adaptively based on global statistics. A histogram of pixel intensities is first built on the whole image, then the intensity threshold is selected so that the number of pixels in the image that are higher than the threshold is roughly 10% of the total number of pixels. The gradient magnitude threshold is determined in a similar way using gradient magnitude histogram. A patch is discarded in the maximum pixel intensity inside the patch is smaller than the intensity threshold, or the maximum gradient magnitude inside the patch is smaller than the gradient magnitude threshold.

According to Property 2, remaining image patches 119 that contain too many high-intensity pixels are discarded, at operation 221. In this example, a patch is identified as having too many high-intensity pixels if it has more than 25% high-intensity pixels (defined in this embodiment as pixels in the top 20% of the intensity histogram). To account for Properties 3 and 4, each candidate patch is divided into two regions: (a) a center region whose dimensions is half of the original patch, and (b) a border region surrounding the center region. In this example, each candidate patch is a rectangular region of the blurred image 117, with a width and a height of the center region being half the width and the height of the candidate patch.

At operation 225, it is computed how many pixels in the border region and in the center region respectively have either high-intensity or high gradient magnitude (e.g. being higher than the above-mentioned thresholds). At operation 227, the computed values for the number of high-intensity or high gradient pixels in the respective border regions are normalized by the respective numbers computed from the corresponding center regions, to produce a border-to-center ratio for high intensity/gradient pixels in each candidate patch. At operation 229, each candidate patch with a ratio higher than a predetermined threshold, in this example embodiment higher than 30%, is discarded. The remaining patches constitute the set of candidate light streak patches 119 identified in operation 204.

Detection of a set of candidate patches, at operation 204, thus in this example embodiment quickly rules out most patches or regions of the blurred image 117 that do not contain light streaks suitable for use in blur kernel estimation, and furthermore generates only a reasonable number of candidate light streak patches 119 for more careful light streak detection. Note that the example parameters used in the above-described example embodiment to provide quantified detection criteria based on Properties 1-4 constitute one example of such an automated candidate patch detection scheme, and may in other embodiments be defined differently, or with different parameter values. Some embodiments may also implement automated light streak patch detection based on only a subset of the patch properties defined above.

After the set of candidate light streak patches 119 has been identified, a prime light streak patch 119*a* is identified in an automated procedure, an example embodiment of which is schematically illustrated under operation 208 in the flowchart of FIG. 2. In this context, the "prime" light streak patch means the light streak patch that is estimated to best approximate the blur kernel 123, and is accordingly selected as a most suitable light streak patch 119 for blur kernel estimation. A brief description of the image processing principles underlying automated identification of the prime candidate light streak patch 119*a* follows, after which description of the example method of FIGS. 1 and 2 is resumed.

Intuitively, the prime light streak patch 119*a* should that one of the candidate light streak patches 119 which best approximates the visual appearance of the blur kernel 123. A light streak looks similar to the blur kernel 123 in terms of kernel shape, but differs from the blur kernel 123 in intensity values. In broad terms, a good candidate light streak patch 119 should contain a well-lit light trajectory or trace that is roughly the same shape as the blur kernel 123, on a relatively clean background (e.g., containing relatively low levels of noise and/or clutter). These characteristics call for an underlying light source to be (a) in-focus, (b) relatively small in size, and (c) well separated from other image structures. At least initially, the blur kernel 123 is, however, unknown, and can therefore not directly be used for selecting or identifying the prime candidate light streak patch 119.

To overcome this difficulty, a power-spectrum-based metric is introduced for automatically identifying and selecting the prime light streak patch 119*a*. In image processing, the power spectrum of an image is defined as the Fourier transform of its autocorrelation function.

Quantification of light streak patch quality is in this embodiment based on comparison between the power spectra of the respective candidate light streak patches 119, and the power spectrum of the blurred image 117. The introduction of this metric is based on the expectation that the power spectrum of the blur kernel 123 (which is as yet unknown) will approximate the power spectrum of the blurred image 117. The candidate light streak patch 119 which is visually closest in appearance to the blur kernel 123 should likewise have a power spectrum that most closely corresponds with that of the blur kernel 123.

In this context, the power-law of natural images describes that $$|\hat{I}(\omega)|^2 \propto \|\omega\|^{-\beta}, \quad (3)$$

where $\hat{I}$ denotes the Fourier transform of an image I (in this case typically the blurred image $\beta$), $\omega$ indicates the frequency coordinates, and $\beta \approx 2$. It is well known that a Laplacian filter can be a good approximation to $\|\omega\|^{-\beta}$, so that, $$|\hat{I}(\omega)|^2 |l(\omega)| \approx C, \quad (4)$$

where l is a Laplacian filter, and C is a constant. For a blurred image B=K*I, the function can be given as, $$|\hat{B}(\omega)|^2 |l(\omega)| = |\hat{I}(\omega)|^2 |\hat{K}(\omega)|^2 |l(\omega)| \approx C|\hat{K}(\omega)|^2. \quad (5)$$

Considered in the spatial domain, Equation (5) gives, $$B \otimes B * L \approx C(K \otimes K), \quad (6)$$

where $\otimes$ is a correlation operator, L denotes the Laclacian filter in the spatial domain, and l is the notation for the Fourier transform of L.

Based on Equation (6), the power-spectrum-metric used for identifying the prime candidate light streak patch 119, at operation 208, is defined in this example as an energy function for a distance between the terms on opposite sides of Equation (6), with the autocorrelation function of a respective light streak patch 119 being substituted for the autocorrelation function of the blur kernel (K), so that, $$d(P, B) = \min_c \|B \otimes B * L - C(P \otimes P)\|, \quad (7)$$

where P is a candidate light streak, and d denotes the power-spectrum-based metric for light streak patch correlation with the blur kernel 123, also referred to herein as the spectral distance. A minimum value for C is determined by solving Equation (7) as a least square problem.

At operation 233 (FIG. 2) a respective spectral distance, d, is calculated for each of the candidate light streak patches 119. At operation 236, the candidate light streak patch 119 with the smallest spectral distance, d, is selected, $$P_0 = \arg_P d(P,B). \quad (8)$$

A benefit of the above-described procedure for automatically identifying a prime light streak patch 119*a* for blur kernel estimation is that the quality quantification scheme inherently favors unsaturated light streaks, as more saturated light streaks tend to have larger spectral distances (d).

As mentioned previously, the selected prime light streak patch 119*a* can thereafter be used in some embodiments to identify, at operation 212, additional light streak patches 119 from the initial candidate set. In this example embodiment, identification of the additional light streak patches 119 comprises, at operation 244, applying a histogram equalization operation to each of the candidate light streak patches 119, to account for intensity or luminosity differences between the light streaks 120 in different patches 119. Thereafter, at operation 248, the Euclidean distance between the candidate patch and the prime candidate patch $P_0$ is computed for each candidate light streak patch 119. The calculated Euclidean distances for the respective candidate light streak patches 119 are then compared to a predefined distance threshold and all candidate light streak patches 119 with respective computed distances greater than the threshold are then discarded, at operation 252. The distance threshold may in some embodiments be provided as a user-customizable parameter. The remaining light streak patches 119 provide a set of selected light streak patches 119 for use in blur kernel estimation.

Light Streak-based Blur Kernel Estimation

After identification of the prime light streak patch 119*a* (or, in embodiments where multiple light streak patches 119 are used, after extraction of the set of selected light streak patches 119), image deblurring is performed based on the extracted light streak information in the form of the extracted prime light streak patch 119*a*, or the set of extracted light streak patches 119. For clarity of description, the extracted light streak information thus further referred to as the extracted light streak patch(es) 119 meaning either the single, prime light streak patch 119*a* or multiple extracted light streak patches 119, as the case may be.

As shown schematically in FIG. 1, the deblurring comprises an alternating, iterative optimization framework of, at operation 107, estimating the blur kernel 123 based on the extracted light streak patch(es) 119, and, at operation 111, recovering the latent image based on the estimated blur kernel 123. The underlying image processing principles for blur kernel estimation based on the extracted light streak patch(es) 119 will now be briefly discussed, after which an example embodiment of the blur kernel estimation operation 107 will be described with reference to the schematic flowchart of FIG. 4.

In this example, estimation of the blur kernel 123 comprises a non-blind deconvolution operation which is solved by constrained optimization, with the extracted light streak patch(es) 119 posed as blur kernel constraint ($\emptyset_K$). Based on Equation (2), a function for non-blind kernel estimation based on a single extracted light streak patch 119 becomes, $$K^{(n+1)} = \underset{K}{\arg\min} \sum_{\partial^*} |\partial^* B - \partial^* I^{(n)} * K|^2 + \phi_K(K, ls), \quad (10)$$

where $l_s$ represents the selected light streak patch 119 and n denotes the iteration index.

The blur kernel constraint is expressed based on the characteristic that light streaks 120 in the identified light streak patches 119 should approximate original or latent light sources blurred in accordance with the blur kernel 123, $$\phi_K(K, ls) = \lambda \sum_{\partial^*} |\partial^* D * K - \partial^* ls|^2 + \mu \|K\|_1 \quad (10)$$

where D denotes a latent, unblurred light source, $\lambda$ denotes an optimization weight for the derivatives, and $\mu$ denotes a $l_1$ regularization weight. Equation (10) thus poses a regression problem in the example form of a least squares optimization function.

Note that the light streak patch derivatives ls are in the error term of Equation (10). It is a benefit of locating the derivatives in the error term that the derivatives deal relatively well with noise, bearing in mind that (unlike blur kernels) the extracted light streak patch(es) 119 typically does not have a clean background. In this example, the blur kernel constraint ($\emptyset_K$) is expressed in Equation (10) as a least squares optimization with L1-norm regularization, with the L1 regularization term provided to enforce sparsity of the blur kernel 123. This is because the blur trajectory should be sparse in the window provided by the corresponding light streak patch 119.

Figure 3:
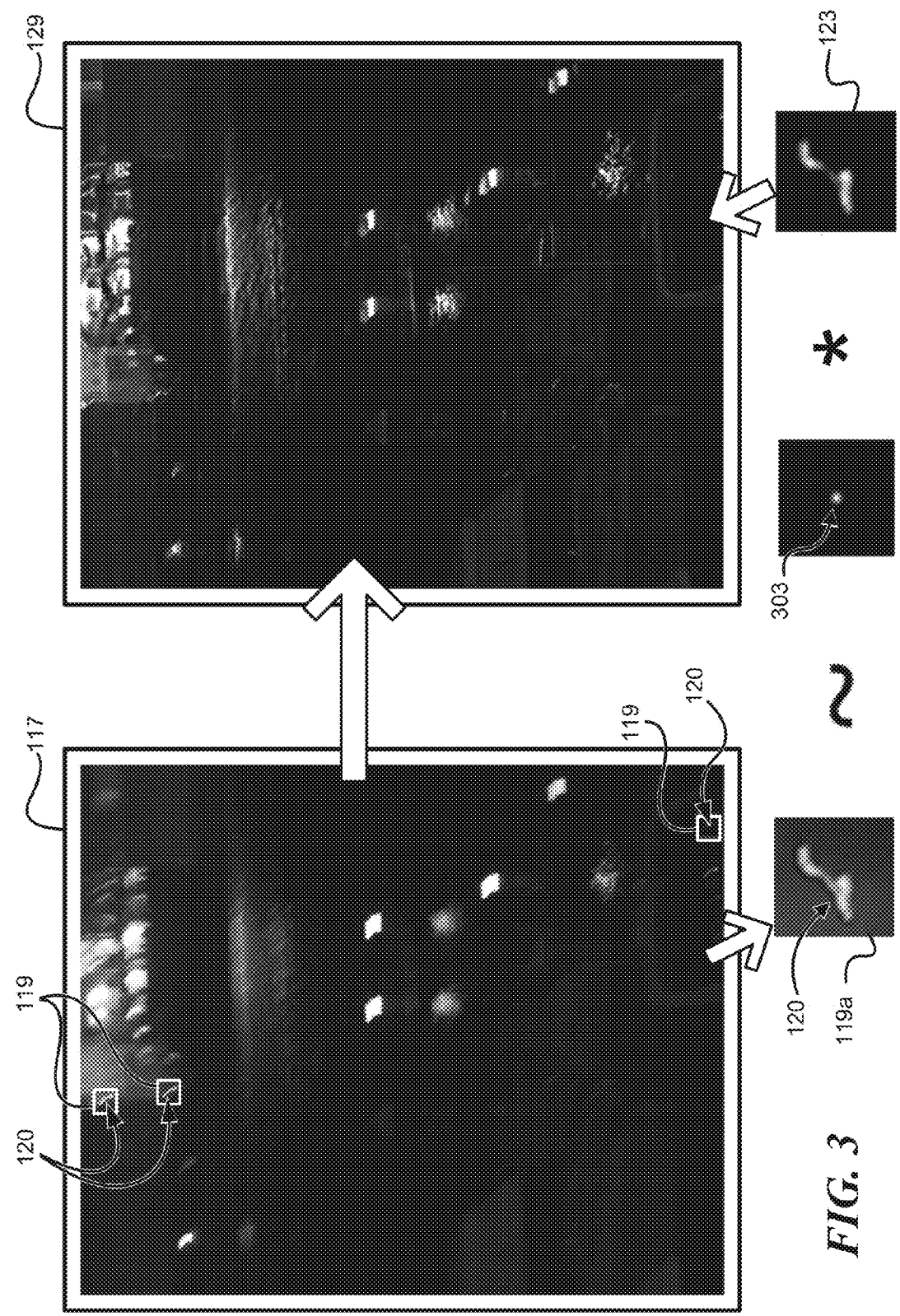
FIG. 3 is a schematic diagram illustrating a blurred image and a deblurred image recovered from the blurred image based at least in part on an estimated blur kernel, in accordance with an example embodiment.

The latent light source D, however, is initially unknown. The example method 100 overcomes ill-posedness of the function in Equation (10) by modeling the extracted light streak patch(es) 119 as a function of the blur kernel 123 and a simulated light source 303 comprising an artificial approximation of the original simulated light source. FIG. 3 schematically illustrates that the expression D*K in Equation (10) represents a modeled light streak patch as a convolution of the approximated simulated light source 303 (indicated D in the equations) with the blur kernel 123 (K). As shown in FIG. 3, the simulated light source 303 (D) is in this example generically approximated as a Gaussian prior, being posited as a point light source where the intensity drop-off from the center point follows a Gaussian function. In other embodiments, the approximated simulated light source 303(D) may be disc-shaped, and/or may have a sharp periphery. Instead, or in addition, the simulated light source 303 may be approximated as having a fixed shape (e.g., a disc) but being variable in size and intensity, depending on the properties of the corresponding observed light streak 120 in the respective extracted light streak patch(es) 119. Referring again to the question (10), it will be understood that the modeled light streak (D*K) should approximate the corresponding light streak patch 119 ($l_s$), so that the closer the correspondence between the modeled light streak and the observed light streak 120, the more accurate is the estimation of the blur kernel 123, K. As presented above, Equation (10) expresses the blur kernel constraint ($\emptyset_K$) based on a single light streak 120 (e.g., the identified prime light streak patch 119a).

It is emphasized that the blur kernel constraint ($\emptyset_K$) is in this example embodiment estimated based on the single patch identified as the prime light streak patch 119a. In other embodiments, however, the blur kernel 123 may be estimated based on two or more light streaks, for example being performed with reference to the multiple light streak patches 119 of the set of light streak patches 119 identified in operation 212 (FIG. 2). In such cases, the approximated light sources 303 (D) for the respective light streak patches 119 can in one example be identical, for example being provided by a Gaussian such as that shown in FIG. 3. In other examples, different respective approximated light sources 303(D) can be modeled for each of the light streak patches 119, for example by taking into account variation in size and intensity between different light streaks.

Because the method 100 is intended to be particularly suitable for deblurring low-light images, and camera sensors typically have limited dynamic ranges, the presence of saturated pixels in blurred images 117 that are to be deblurred is expected to be a regular occurrence. Pixels that receive more photons than the maximum capacity of the camera sensor are saturated and the corresponding pixel intensities will be clipped. This is a common scenario when shooting a night image with longer exposure, where the majority of the scene is dark but there are some bright light sources in the scene. To deal with or ameliorate undesired effects of saturated pixels during deconvolution (e.g., ringing artifacts), a non-blind deconvolution method to handle outliers that do not satisfy the blur model can be used. In this example, the method adopted is that described by Cho, Wang, and Lee, in "Handling Outliers In Non-Blind Image Deconvolution", *Proceedings Of IEEE International Conference On Vision*, 2011, which comprises classifying observed pixel intensity into two categories: (a) inliers whose formation satisfies the blur model, and (b) outliers whose formation does not satisfy the blur model. Such outliers include clipped pixels and those from other sources. As described in detail in the above-referenced document, a pixel-wise weight map can be calculated for a blurred image, and which can be used to exclude outliers from the deconvolution process.

In this example embodiment, such a weight map is applied in the kernel estimation step (at operation 107 of FIG. 1). As mentioned, the application of the weight map (w) makes the formulation consistent and reduces the influence of outliers. Equation (9) can then be given as, $$K^{(n+1)} = \underset{K}{\arg\min} \sum_{\partial^*} \sum_{x} w_x |\partial^* B_x - \partial^* (I^{(n)} * K)_x|^2 + \phi_K(K, ls). \quad (11)$$

where w is the weight map, and the subscript $_x$ is the pixel index.

To solve the problem of Equation (11), an iterative-related-least-square method (IRLS) method can be used, in which case the right side of Equation (11) can thus be expressed in matrix form, as, $$f_k(k) = |W(A_1 k - b_1)|^2 + \lambda |A_2 k - b_2|^2 + \hat{\mu} k^T k, \quad (12)$$

where W is the weight map, $A_1$ denotes the matrix consisting of $\Box * I$, $A_2$ denotes the matrix consisting of $\Box * D$, $b_1$ denotes a vector consisting of $\Box * B$, $b_2$ denotes a vector consisting of $\Box * l_s$, and $\hat{\mu}$ represents the regularization weight ($\mu$) in the IRLS method.

In this example embodiment, optimization of Equation (12) is performed by use of a conjugate gradient method, details of which will be familiar to a person of skill in the art, as described, for example, by Cho and Lee, "Fast motion deblurring", in *Proceedings Of ACM SIGGRAPH Asia*, 2009. In accordance with the conjugate gradient method, the gradient of the function given in Equation (12) is defined as, $$\frac{\partial f_k(k)}{\partial k} = 2A_1^T W^T W A_1 k - 2A_1^T W^T W b_1 + 2\lambda A_2^T A_2 k - 2\lambda A_2^T b_2 + 2\hat{\mu}k. \quad (13)$$

which can be solved in an iterative, reweighted optimization operation wherein the optimization weight $\lambda$ is iteratively adjusted.

Light Streak-based Blur Kernel Estimation

In the image reconstruction operation (e.g., at operation 111 in FIGS. 1 and 4) the blur kernel 123 is fixed (thus not being treated as a variable) allowing non-blind deconvolution of the blur kernel and the latent image, for example according to the function, $$I^{(n+1)} = \operatorname*{argmin}_I \sum_{\partial^*} |\partial^* B - \partial^* I * K^{(n+1)}|^2 + \phi_I(I). \quad (14)$$

To deal with saturation, the weight map ($w_x$) is added to this latent image energy function, similar to that described above with reference to the blur kernel estimation. The image reconstruction can thus be written as, $$I^{(n+1)} = \operatorname*{argmin}_I \sum_{\partial^*} \sum_x w_x |\partial^* B_x - \partial^* (I * K^{(n+1)})_x|^2 + \phi_I(I). \quad (14)$$

$$\text{where, } \phi_I(I) = \sum_{\partial^*} \sum_x |(\partial^* I)_x|^2. \quad (16)$$

The estimated latent image I that is provided by optimization of Equation (15) can be delivered as the deblurred image 129. As illustrated schematically in FIG. 4, an alternating, iterative optimization framework is adopted in this example embodiment, wherein the estimated latent image is provided as input for another iteration of the blur kernel estimation operation, with the resultant estimated blur kernel serving as input for another iteration of the latent image reconstruction operation, and so forth.

Figure 4:
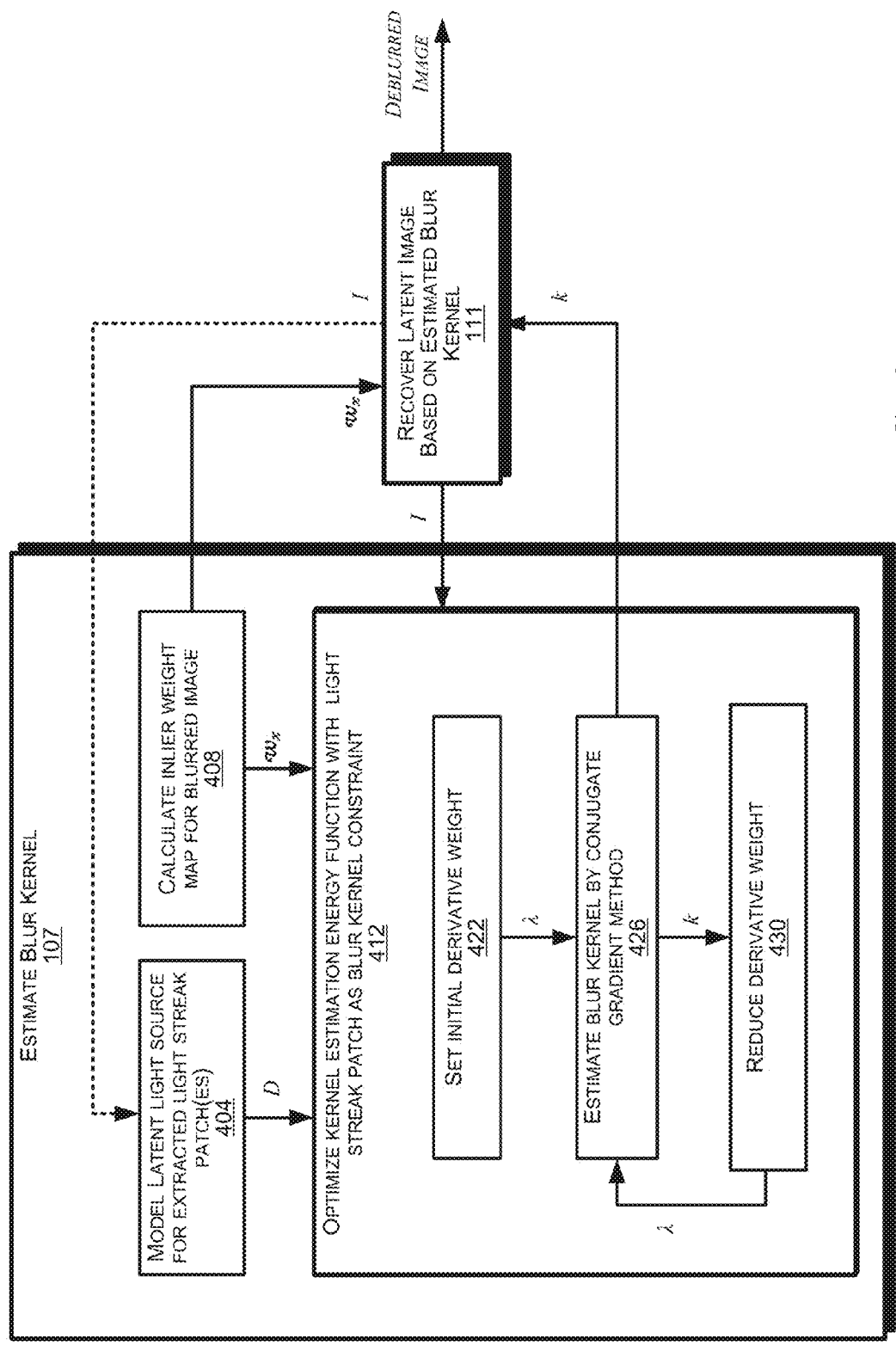
FIG. 4 is a schematic flowchart of an example optimization operation and an example image recovery operation, in accordance with an example embodiment and forming part of the method of FIG. 1.

FIG. 4 is a schematic flowchart that shows an overview of the example deblurring optimization framework, according to the above-described estimation principles. At operation 404, the simulated light source 303 (D) is modeled for the extracted light streak patch(es) 119, in this embodiment being a Gaussian prior, as described. In other embodiments, simulation of the simulated light source(s) 303, at operation 404, may be patch-specific, and may be based on information in the extracted light streak patch(es) 119. At operation 408, an inlier/outlier weight map ($w_x$) is calculated based on the blurred image 117 in accordance with or analogous to the method of Cho, Wang, and Lee, as referenced above.

The received weight map ($w_x$), simulated light source 303 (D), and blurred image (I) are then used, at operation 412, to estimate the blur kernel (K) by optimizing the energy function of Equation (11). The optimization is, in this embodiment, solved by the conjugate gradient method, using Equation (13). During the iterative optimization process of operation 412, the optimization weight ($\lambda$) is, at operation 422, initially set based on the sizes of the blurred image 117 and the blur kernel 123, so that the two components (i.e., the error term and the blur kernel constraint) of Equation (9) are of similar scale. As the iteration proceeds, the value of the optimization weight $\lambda$ is gradually reduced, thereby gradually reducing the importance of the light streak-based optimization constraint in the function which is being optimized. Note, for example, that the light streak patch(es) 119 ($l_s$) and the approximated simulate light source 303 (D), or their matrix equivalents $A_2$ and $b_2$, in equations (12) and (13), occur only in terms which have the optimization weight $\lambda$ as coefficient. The initial setting of the optimization weight, as well as the gradual reduction thereof during optimization, may be performed automatically. Such gradual reduction of the optimization weight for the light streak constraint is based on the understanding that the light streak 119 differs from the blur kernel 123 in terms of intensity values. The optimization weight ($\lambda$) is initialized with a large value so that the shape and intensity values of the initially estimated blur kernel 123 is similar to that of the light streak 119, but the optimization weight is later reduced to improve the kernel estimation by the image error.

After the blur kernel 123 has been estimated, at operation 426, the latent image is recovered, at operation 111, by a regularized Richardson-Lucy deconvolution based on Equation (15), and using the estimated blur kernel (K) produced in the iterative estimation of operation 426. The recovered latent image (I) can then be used as an input for another iteration of blur kernel estimation, at operation 412. This alternating optimization procedure may be repeated until a final output image is delivered as the deblurred image 129 (FIG. 3).

In embodiments which do not use a generic approximated light source 303 D for modeling the light streak patch(es) 119, but instead uses patch-specific light source modeling, the recovered latent image I can be used, after each iteration of latent image recovery (operation 111), as input for refined light source modeling, at operation 404. The next iteration of blur kernel estimation, at operation 412, may thus be performed based on the refined approximated light sources 303 (D).

In this example embodiment, an initial value for the derivative weight parameter, $\lambda$, is automatically selected, at operation 422, based on the respective sizes of the blurred image 117 and blur kernel 123, so that the two components of Equation (10) are similar in scale.

Example System Embodiment

Figure 5:
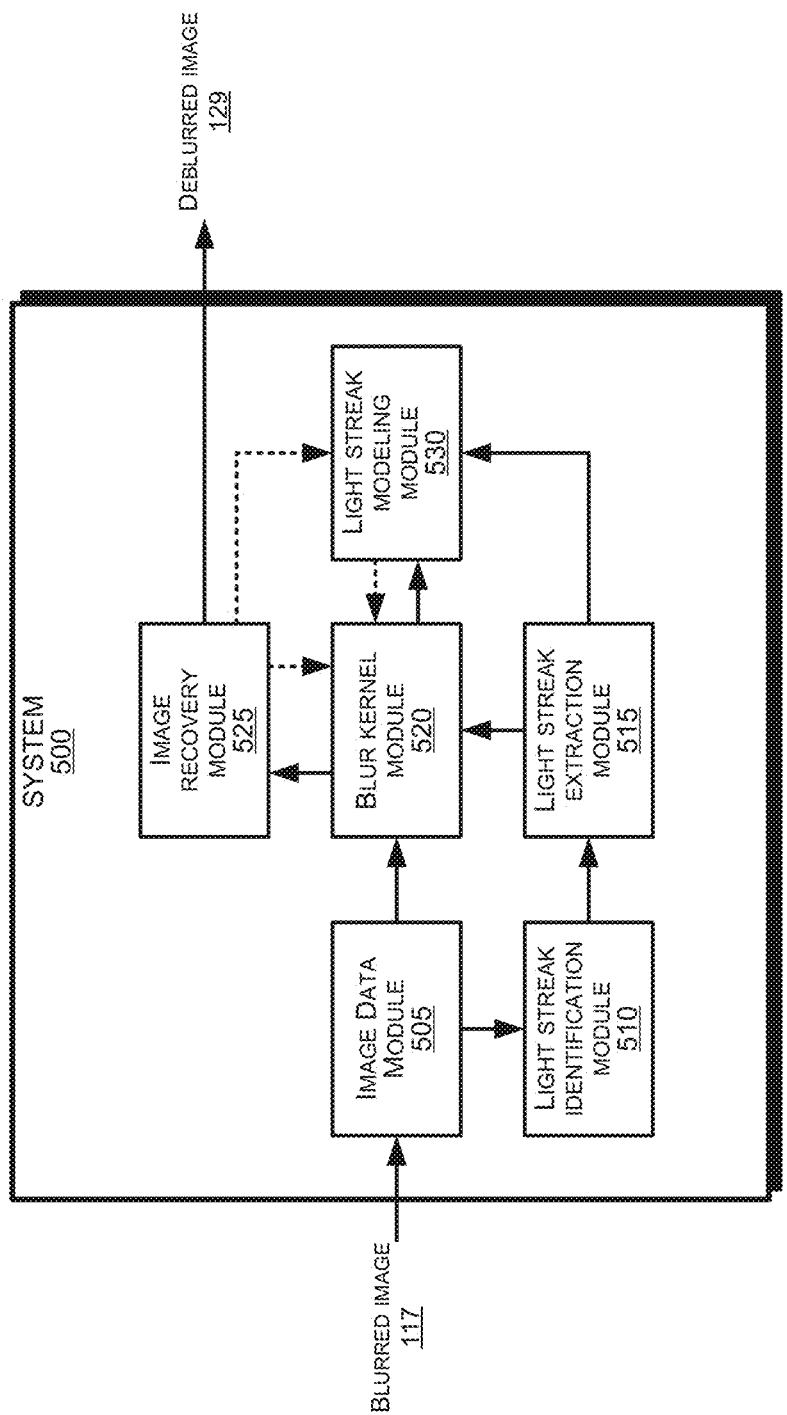
FIG. 5 is a conceptual diagram of a system for deblurring an image based on light streaks in the image, in accordance with an example embodiment.

FIG. 5 shows a schematic view of an example embodiment of a system 500 for deblurring images based on image-sourced light streaks. In this embodiment, the system 500 is a client desktop computer system (e.g., having computer hardware such as that described with reference to FIG. 6) having stored thereon and executing a photo editing application (such as the Adobe® Photoshop® family of applications). In other example embodiments, the system 500 may comprise two or more networked computing devices, and/or may include a mobile computing device. Data processing for image deblurring may be localized or distributed.

The system 500 is in this example embodiment configured to recover deblurred blurred images in accordance with the example embodiment of the method 100 described with reference to FIGS. 1-4. For ease of reference, like reference numerals indicate like elements in FIGS. 1-4, and in FIG. 5. The system 500 includes an image data module 505 that is configured to access image data representative of a blurred image 117 (see FIG. 3), in this example being a digital photograph captured in low-light conditions and having a spatially invariant motion blur due to camera shake during exposure.

The system 500 further includes a light streak identification module 510 configured to process the image data of the blurred image 117 in order to identify in the blurred image 117 one or more light streaks 120 caused by camera motion during image capture (e.g., shaking of a handheld camera) relative to a scene captured in the blurred image 117. The light streak identification module 510 may be configured for automatically performing procedures discussed under operation 204 of the example method of FIG. 2.

The system 500 may further include a light streak extraction module 515 to extract light streak information from the blurred image 117 based on the identified light streaks 120, for example performing an operation similar or analogous to those discussed with reference to operations 208 and 212 in the example method of FIG. 2. In this example embodiment, the light streak information comprises the light streak patch(es) 119 selected for use in blur kernel estimation. In instances where blur kernel estimation is performed based only upon a single light streak patch 119, the light streak extraction module 515 may be configured to extract the light streak information in the form of the identified prime candidate light streak patch 119. Instead, or in addition, the light streak extraction module 515 may be configured to extract light streak information that includes multiple light streak patches 119, for example comprising a set of light streak patches 119 identified and selected in a manner summary or analogous to the procedures described with reference to example operation 212 in FIG. 2.

The system 500 may also include a light streak modeling module 530 configured for defining a modeled light streak for each extracted light streak patch 119 that is to be used in blur kernel estimation. The light streak modeling module 530 may therefore be configured to perform the actions described above with reference to FIG. 3, and/or with reference to operation 404 of FIG. 4. As discussed this may comprise defining identical generic simulated light sources 303 for multiple light streak patches 119. Instead, the light streak modeling module 530 may be configured to define and update a different simulated light source 303 for each respective light streak patch 119.

The system 500 further comprises a blur kernel module 520 configured to estimate a blur kernel 123 for the blurred image 117 by performing a constrained optimization procedure that uses the extracted light streak information as an input. In this example embodiment, the blur kernel module 520 is configured to estimate the blur kernel 123 in accordance with the example methods and actions discussed with reference to example operation 107 in FIGS. 1 and 4. The blur kernel module 520 may be configured for cooperation with an image recovery module 525 which is configured for iteratively recovering a latent image for the blurred image 117 based on an interim estimated blur kernel 123 delivered as output from the blur kernel module 520, as discussed with reference to operation 111 in FIGS. 1 and 4 above. The image recovery module 525 may further be configured for the recovered image as an input for a successive iteration to the blur kernel module 520 and/or to the light streak modeling module 530. Finally, the image recovery module 525 can be configured to deliver the two blurred image 117 as output of the deblurring method 100, for example by displaying the blurred image 117 on a screen of a user device.

It is a benefit of the example methods and systems described above that improve image deblurring is provided, particularly for images captured in low-light conditions. A reason for improved deblurring speed and quality, compared to the existing methods, is improved accuracy and stability of blur kernel estimation resulting from optimization with extracted light streak information from the image as a blur kernel constraint. Some existing methods use a light streak or a corrected light streak directly as the blur kernel. Results of such methods, however, often unsatisfactory and unpredictable, because the light streak is seldom a perfectly accurate reflection of the blur kernel. Information loss resulting, for example, from saturation of parts of the selected light streak used for the blur kernel can often result in inaccurate deblurring results.

A further benefit is that accuracy and stability of deblurring is improved by automatic light streak detection. Some existing methods rely on user-selection of light streaks, but users are seldom aware of the specific light streak properties which promote accurate deblurring. The disclosed method does not, in some embodiments, rely on user judgment with respect to light streak quality assessment, but instead identifies suitable light streaks (and in some cases a best light streak patch) in an automatic operation that is thus repeatable and produces predictable deblurring results.

Figure 6:
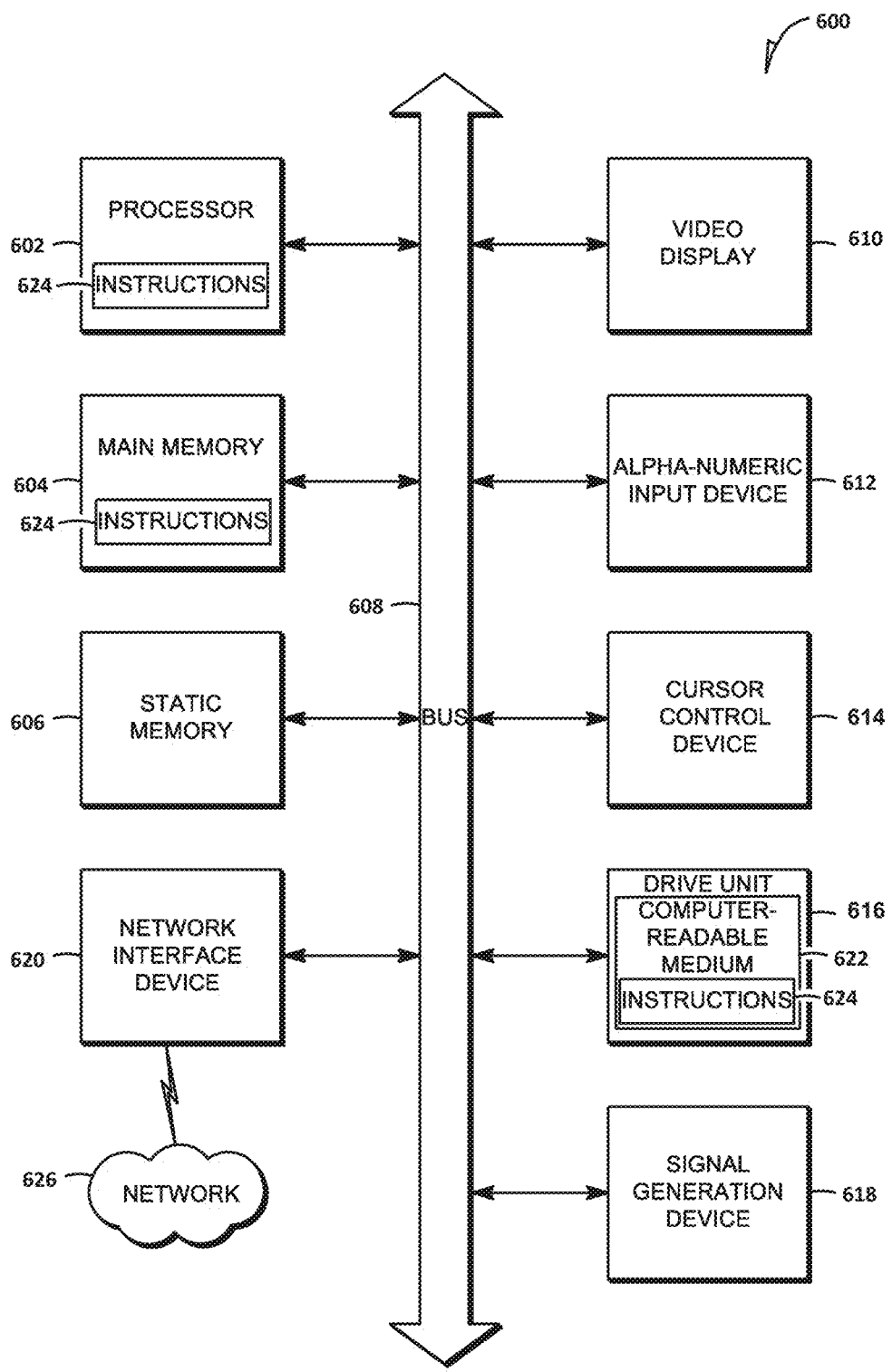
FIG. 6 is a block diagram illustrating components of a machine, according to some example embodiments, able to read instructions from a machine-readable medium and perform any one or more of the methodologies discussed herein.

FIG. 6 is a block diagram illustrating components of a machine 600, according to some example embodiments, able to read instructions from a machine-readable medium (e.g., a machine-readable storage medium) and perform any one or more of the methodologies discussed herein, in whole or in part. The machine 600 may therefore provide at least part of the system 500 of FIG. 5. Specifically, FIG. 6 shows a diagrammatic representation of the machine 600 in the example form of a computer system and within which instructions 624 (e.g., software, a program, an application, an applet, an app, or other executable code) for causing the machine 600 to perform any one or more of the methodologies discussed herein may be executed. In alternative embodiments, the machine 600 operates as a stand-alone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a video display 610 (e.g., a plasma display panel (PDP), a light emitting diode (LED) display, a liquid crystal display (LCD), a projector, or a cathode ray tube (CRT)). The machine 600 may also include an alphanumeric input device 612 (e.g., a keyboard), a cursor control device 614 (e.g., a mouse, a touchpad, a trackball, a joystick, a motion sensor, or other pointing instrument), a storage unit in the example form of a drive unit 616, a signal generation device 618 (e.g., a speaker), and a network interface device 620.

The storage unit 616 includes a machine-readable medium 622 (also referred to as "computer-readable medium") on which is stored the instructions 624 embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 via the network interface device 620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 (or computer-readable medium) is shown in an example embodiment to be a single medium, the terms "machine-readable medium" and "computer-readable medium" should be taken to include a single medium or multiple media (e.g., a centralized or distributed database, or associated caches and servers) able to store instructions 624. The terms "machine-readable medium" and "computer-readable medium" shall also be taken to include any medium, or combination of multiple media, that is capable of storing instructions (e.g., instructions 624) for execution by a machine or computer (e.g., machine 600), such that the instructions, when executed by one or more processors of the machine or computer (e.g., processor 602), cause the machine or computer to perform any one or more of the methodologies described herein. Accordingly, a "machine-readable medium" refers to a single storage apparatus or device, as well as "cloud-based" storage systems or storage networks that include multiple storage apparatuses or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Of course, the functions described herein for any single machine, database, or device may be subdivided among multiple machines, databases, or devices. As used herein, a "database" is a data storage resource and may store data structured as a text file, a table, a spreadsheet, a relational database (e.g., an object-relational database), a triple store, a hierarchical data store, or any suitable combination thereof.

What is claimed is:

1. A method comprising:
   accessing image data for a blurred image of a subject scene;
   based on the image data, identifying in the blurred image one or more light streaks caused by camera motion during image capture relative to one or more corresponding light sources forming part of the subject scene;
   extracting light streak information from the blurred image based on the one or more identified light streaks;
   in an automated operation using one or more processors, estimating a blur kernel for the blurred image by performing a constrained optimization procedure that uses the extracted light streak information and one or more simulated light sources as inputs, the blur kernel being representative of the camera motion during image capture; and
   defining one or more modeled light streaks corresponding to the one or more identified light streaks in the blurred image, the one or more modeled light streaks comprising respective convolutions of the blur kernel with the one or more simulated light sources.

2. The method of claim 1, further comprising estimating a deblurred image of the subject scene by performing a computation that uses the estimated blur kernel as an input, the computation for estimating the deblurred image being separate from the constrained optimization procedure for estimating the blur kernel.

3. The method of claim 1, wherein the constrained optimization procedure for estimating the blur kernel uses a blur kernel optimization constraint that is based at least in part on the extracted light streak information.

4. The method of claim 3, wherein the blur kernel optimization constraint comprises one or more light streak patches extracted from the blurred image, each light streak patch including a respective one of the one or more identified light streaks.

5. The method of claim 1, wherein the constrained optimization procedure for estimating the blur kernel comprises:
   defining a blur kernel energy function based at least in part on a difference between the one or more identified light streaks and the one or more corresponding modeled light streaks; and
   optimizing the blur kernel energy function by modifying values for the estimated blur kernel to minimize the difference between the one or more identified light streaks and the one or more corresponding modeled light streaks.

6. The method of claim 1, wherein the identification of the one or more light streaks and the extracting of the light streak information are performed automatically, without user input.

7. The method of claim 6, wherein the automatic identification of the one or more light streaks comprises identifying in the blurred image one or more candidate light streak patches which satisfy predefined light streak identification criteria for quantified assessment of image patch properties that include:
- centrality of light streak location in a respective image patch;
- sparsity of distribution of high-intensity pixels in the respective image patch; presence of non-light-streak image structures in the respective image patch; and
- a distribution ratio for high-intensity pixels or high-gradient pixels between a center region and a border region of the image patch.

8. The method of claim 6, wherein the identification of the one or more light streaks comprises automatically identifying multiple candidate light streak patches in the blurred image, each candidate light streak patch having a corresponding light streak, the method further comprising:
- calculating a light streak quality metric for each candidate light streak patch; and
- identifying from the multiple candidate light streak patches a prime light streak patch as the candidate light streak patch which has a highest calculated light streak quality metric.

9. The method of claim 8, wherein the light streak quality metric is based at least in part on comparative analysis of a power spectrum for the blurred image and the power spectrum for each respective candidate light streak patch.

10. The method of claim 8, further comprising, based at least in part on quantified assessment of similarities between the respective candidate light streak patches and the prime light streak patch, identifying a set of light streak patches for use in the estimating of the blur kernel.

11. A system comprising:
- one or more processors; and
- a memory, coupled with the one or more processors, having instructions embodied thereon, the instructions, when executed by the one or more processors, to provide the system with:
  - an image data module configured to access image data for a blurred image of a subject scene;
  - a light streak identification module configured for processing the image data to identify in the blurred image one or more light streaks caused by camera motion during image capture relative to one or more corresponding light sources forming part of the subject scene;
  - a light streak extraction module configured to extract light streak information from the blurred image based on the one or more identified light streaks;
  - a blur kernel module comprising one or more computer processors, the blur kernel module being configured to estimate a blur kernel for the blurred image by performing a constrained optimization procedure that uses the extracted light streak information and one or more simulated light sources as inputs, the blur kernel being representative of the camera motion during image capture; and
  - a light streak modeling module configured to define one or more modeled light streaks corresponding to the one or more identified light streaks in the blurred image, the one or more modeled light streaks comprising respective convolutions of the blur kernel with the one or more simulated light sources.

12. The system of claim 11, wherein the instructions further provide the system with an image recovery module configured to estimate a deblurred image of the subject scene by performing a computation that uses the estimated blur kernel as an input, such that each iteration of the computation for estimating the deblurred image is performed separately from the constrained optimization procedure for estimating the blur kernel.

13. The system of claim 11, wherein the blur kernel module is further configured to perform the constrained optimization procedure using the extracted light streak information as an optimization constraint for the blur kernel, so that at least a shape of the blur kernel is constrained by respective shapes of the one or more identified light streaks represented by the extracted light streak information.

14. The system of claim 11, wherein the constrained optimization procedure for estimating the blur kernel comprises:
- defining a blur kernel energy function based at least in part on a difference between the one or more identified light streaks and the one or more corresponding modeled light streaks; and
- optimizing the blur kernel energy function by modifying values for the estimated blur kernel to minimize the difference between the one or more identified light streaks and the one or more corresponding modeled light streaks.

15. The system of claim 11, wherein the light streak identification module is further configured to automatically identify, without user input, a set of candidate light streak patches in the blurred image, by:
- calculating, for multiple image patches in the blurred image, a respective value for one or more quantified light streak patch identification criteria; and
- selecting for inclusion in the set of candidate light streak patches each one of the multiple image patches for which the corresponding calculated light streak patch identification criteria values satisfy a predefined threshold.

16. The system of claim 11, wherein the light streak identification module is further configured to automatically, without user input:
- identify multiple candidate light streak patches in the blurred image, each candidate light streak patch including a corresponding light streak;
- calculate a respective value for a light streak quality metric for each candidate light streak patch; and
- based on the respective light streak quality metric values, identifying from the multiple candidate light streak patches a prime light streak patch.

17. The system of claim 16, wherein the light streak quality metric is based at least in part on computing a measure of correspondence between a power spectrum of the blurred image and a power spectrum for a respective one of the multiple candidate light streak patches.

18. A non-transitory machine-readable storage medium comprising instructions that, when executed by one or more processors of a machine, cause the machine to:
- access image data for a blurred image of a subject scene;
- based on the image data, identify in the blurred image one or more light streaks caused by camera motion during image capture relative to one or more corresponding light sources forming part of the subject scene;
- extract light streak information from the blurred image based on the one or more identified light streaks;
- estimate a blur kernel for the blurred image by performing a constrained optimization procedure that uses the extracted light streak information and the one or more simulated light sources as inputs, the blur kernel being representative of the camera motion during image capture; and
- define one or more modeled light streaks corresponding to the one or more identified light streaks in the blurred image, the one or more modeled light streaks comprising respective convolutions of the blur kernel with one or more simulated light sources.

* * * * *